US006234151B1

(12) United States Patent
Eck

(10) Patent No.: US 6,234,151 B1
(45) Date of Patent: May 22, 2001

(54) FUEL SUPPLY SYSTEM

(75) Inventor: Karl Eck, Frankfurt (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/515,231

(22) Filed: Feb. 29, 2000

(51) Int. Cl.$^7$ .......................... F02M 53/00; F02M 55/00; F02M 31/20

(52) U.S. Cl. ........................................... 123/514; 123/541

(58) Field of Search ................................. 123/541, 514, 123/456

(56) References Cited

U.S. PATENT DOCUMENTS

| | | | |
|---|---|---|---|
| 4,411,239 | * 10/1983 | Kelch | 123/541 |
| 4,872,438 | * 10/1989 | Ausiello et al. | 123/514 |
| 5,551,404 | * 9/1996 | Bauerle et al. | 123/514 |
| 5,794,598 | * 8/1998 | Janik et al. | 123/514 |
| 5,832,903 | * 11/1998 | White et al. | 123/514 |
| 6,021,759 | * 2/2000 | Okajima et al. | 123/514 |
| 6,024,064 | * 2/2000 | Kato et al. | 123/514 |

* cited by examiner

Primary Examiner—Marguerite McMahon
(74) Attorney, Agent, or Firm—Mayer, Brown & Platt

(57) ABSTRACT

In a fuel supply system for diesel engines, which comprises
- a fluidic series connection of a fuel pump (5) sucking out of a tank (1), of a fuel filter (7) and of a high-pressure pump (9),
- a parallel connection, located downstream of the high-pressure outlet (14) of the high-pressure pump (9), of a plurality of injectors (16) or injection nozzles and of an electrically controllable high-pressure regulating valve (17) with a return line (20), said parallel connection being capable of being fed by the high-pressure pump with a fuel stream under a pressure which is variable, as required, by the activation of the high-pressure regulating valve,
- at least one return line (18) for recirculating a fuel excess from the high-pressure regulating valve and/or the injectors into the tank (1), and
- at least one cooler (19, 21) arranged in a return line, according to the invention a first return line (18) is located downstream of the injectors (16) and a second return line (20) downstream of the high-pressure regulating valve (17), and at least the second return line (20) is connected to a cooler (21) which is connected on the outlet side to the connection between the fuel pump (5) and the high-pressure pump (9), preferably upstream of the fuel filter.

The main advantages of this arrangement are the relief of the fuel pump, the heating of the fuel filter which commences near the starting time and particularly thorough cleaning of the fuel stream through the high-pressure pump due to circulation via the filter.

12 Claims, 1 Drawing Sheet

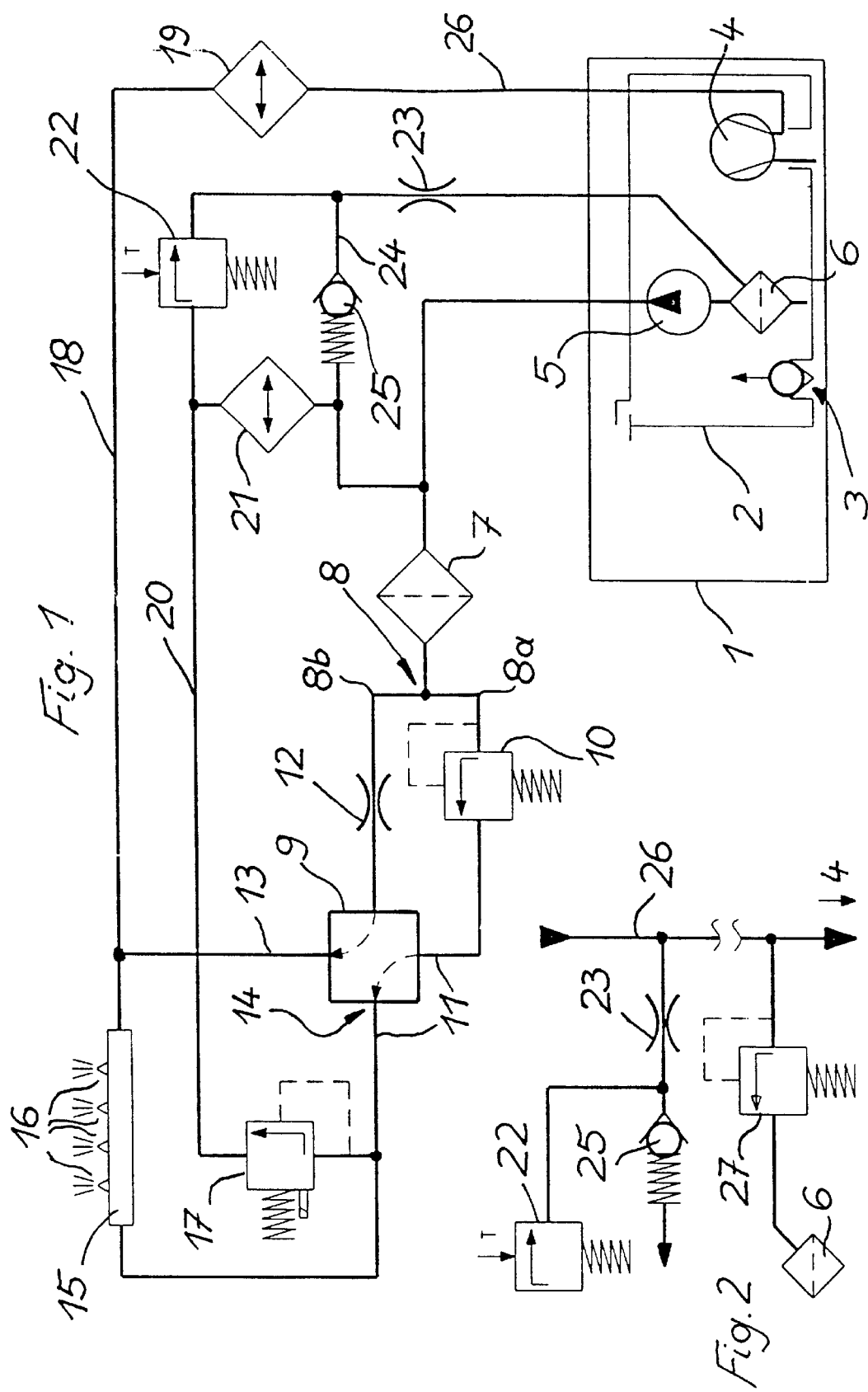

FUEL SUPPLY SYSTEM

The invention relates to a fuel supply system.

These features are provided in a fuel supply system for diesel engines which is known from practice. An electrically driven fuel pump provided in the tank conveys a variable fuel stream of more than 40 l/h at a minimum pressure of 500 hPa (0.5 bar). It feeds, via a fuel filter, a high-pressure pump, driven mechanically (for example, by the camshaft), with a relatively low operating forward-flow pressure, downstream of the filter, of at least 1,200 hPa (1.2 bar).

According to the high-pressure pump specification, this feed stream should not be hotter than a maximum of 100° C. A cooling and lubricating stream for the high-pressure pump is branched off from this feed stream by means of a first pressure regulating valve via a throttle, said cooling and lubricating s ream amounting to approximately 30 to 50 l/h and being heated, on average, by 5° C.

The high-pressure pump generates a high forward-flow pressure of between approximately 300 and 1350 bar for feeding a common rail having injectors for the diesel engine. The pressure in the common rail is set at a predeterminable variable level by means of an electrically adjustable high-pressure regulating valve (proportional valve).

The high-pressure pump is therefore designed in such a way that, even at low rotational speeds, a rapid pressure rise from the lower pressure value to the upper can, if required, be delivered to the common rail by the electrically controlled pressure regulating valve.

When the rotational speeds of the engine are high, the high-pressure feed stream is well above what is required. A large spill quantity (approximately 60 l/h and above) therefore occurs at the high-pressure regulating valve.

The common rail comprises a series of injectors or injection nozzles which, in turn, can likewise be activated electrically by means of a control device. Thus, both the injection quantities and the injection times can be predetermined in a clearly defined manner. In the known system, the injectors are designed as electric hydraulic valves with a hydraulic auxiliary circuit. A spill quantity (5 l/h, even markedly higher, depending on the vehicle type) likewise occurs in the latter when the valves are opened.

A further restriction is that the spill or return flow should have a pressure difference of at most 600 hPa relative to the atmosphere.

A particular problem of this system is that the spill quantities to be recirculated to the tank via a return line are heated up considerably, as compared with the forward flow to the high-pressure pump. This temperature increase occurs during the sudden reduction in the pressure delivered by the high-pressure pump at the pressure regulating valve—here alone, a heat capacity of more than 2 kW is released—or at the injectors, due to the in-phase energy conversion (without evaporation) of the fuel.

In order to reduce the return temperature as far as possible, the relatively insignificantly heated cooling and lubricating stream mentioned is already admixed as a part stream with the return flow. Also, a branch line having an overflow valve (nonreturn valve) may be provided between the line from the fuel pump and the return, and, when a specific forward-flow pressure of the fuel pump is exceeded, said branch line carries a still relatively insignificantly heated fuel quantity which can be used for cooling the return flow. A cooler is also provided in the return to the tank, but the efficiency of said cooler is reduced due to the cooling stream being admixed.

As a result of the considerable return quantities having measured temperatures of more than 100° C., the tank content is still heated to an increasing extent, so that the forward-flow temperature of the electric fuel pump also necessarily rises. In this configuration, the latter has to continually convey considerably more fuel than can be consumed at the injectors.

A fundamental problem of diesel filters is that they become clogged at very low temperatures due to the flocculation (paraffining) of the fuel. This leads to an increased pressure drop at the filter, so that the delivery pressure is no longer sufficient for the high-pressure pump. Heatable filters are already used to remedy this.

The object on which the invention is based is to improve a generic fuel supply system.

This object is achieved, according to the invention, by means of the defining features of patent claim 1. The features of the subclaims specify advantageous developments of this subject.

The spill quantities mentioned are now carried in each case via their own return lines. The much greater spill quantity of the high-pressure regulating valve is fed directly to a cooler.

Furthermore, the spill stream of the injectors may be intermixed with the lubricating and cooling stream from the high-pressure pump. This part quantity of the return may likewise run through a cooler upstream of the tank if the spill stream of the injectors is large in relation to the lubricating and cooling stream and the overall quantity is therefore highly heated. This second cooler may, however, be dispensed with if the return from the injectors is low (5 l/h).

These measures improve the efficiency of the cooler for the main return quantity. Moreover, the return from the high-pressure regulating valve is not or is no longer completely recirculated into the tank after cooling, but, instead, at least a large part of said return is fed into the forward-flow line between the fuel pump and the high-pressure pump. The fuel pump is consequently markedly relieved due to a reduction in its delivery, so that a smaller and less expensive pump can be used.

Particularly advantageously, the fuel filter is heated by means of a preheated fuel flow, in that said return quantity is fed into the forward-flow line upstream of the filter. Thus, the filter is protected against clogging at low temperatures, since high return temperatures occur very quickly, even shortly after the engine has been started. The cooler will therefore be dimensioned in such a way that, although the permissible forward-flow temperature of the high-pressure pump is not exceeded, the flocculation of the diesel fuel is reliably prevented.

Furthermore, the circulation flow through the filter, the latter being maintained as instructed, ensures that the high-pressure pump is supplied with very thoroughly cleaned fuel, so that its service life is increased, as compared with conventional systems.

The heating capacity of the return flow can be utilized at low ambient temperatures particularly effectively and near the starting time if a part quantity is led past the cooler via a thermally controlled valve which, in particular, opens at low temperatures. This part quality may, on the one hand, be led into the tank, preferably directly to the suction screen of the fuel pump, so that said suction screen, too, can be brought quickly to a flocculation-proof operating temperature.

Heating of the fuel filter between the fuel pump and high-pressure pump near the starting time is achieved if, according to a further design, the outlets of the cooler and of the thermally controlled valve are connected via a branch line to a nonreturn valve through which the flow can pass from the valve.

Expediently, a throttle will be provided, downstream of the branch point of the branch line, in the connection of the outlet of the valve to the tank, so that the pressure coming from the fuel pump in said branch line can be overcome when the nonreturn valve is open.

If at least part quantities of the streams of the first and second return lines are brought together downstream of the coolers and then led jointly to the tank, a considerable reduction in the length of double line routing can be achieved. This is expedient particularly in view of the conventional spatial arrangement of the engine on the front axle and of the tank on the rear axle.

Further details and advantages of the subject of the invention may be gathered from the drawing of two design variants and from the following detailed description of these.

In the simplified illustration of the drawing:

FIG. 1 shows a first embodiment,

FIG. 2 shows a second embodiment as a detail from FIG. 1.

According to FIG. 1, a tank 1 has provided in it a baffle 2 which is topped up from the tank content via a bottom valve 3 and, during driving, additionally by means of a suction jet pump 4. An electrically driven fuel pump 5 sucks fuel out of the baffle 2 via a suction screen 6 and conveys it via a fuel filter 7 to a branch point 8 upstream of a high-pressure pump 9 which is indicated merely diagrammatically here as a block. In the first branch 8a, a pressure relief valve 10 precedes the suction side of the main stream 11 of the high-pressure pump 9, whilst, in the second branch, a throttle 12 precedes a lubricating and cooling stream 13 of the high-pressure pump.

The main stream 11 emerges on the delivery side 14 of the high-pressure pump and arrives at a common rail 15 which is equipped with a plurality of injectors 16. These are designed in a way known per se, not illustrated in any more detail, as electrically activatable injection nozzles with a hydraulic auxiliary circuit. They deliver the fuel required to an internal combustion engine, in particular an air-compression engine, that is to say the fuel quantity actually consumed by the engine emerges here from the fuel supply system, whilst a—much greater—excess quantity is merely circulated, experiencing a continuous increase in temperature.

The pressure available at the common rail 15 is dimensioned by means of a high-pressure regulating valve 17 which is likewise connected to the delivery side 14 of the high-pressure pump and can be controlled electrically in a way not shown in any more detail. The electronic evaluation and control unit used for this purpose is not a subject of the invention, so that it will not be dealt with in any more detail here.

Spill quantities both from the common rail 15 and from the high-pressure regulating valve 17 occur during operation. As already mentioned initially, these spill quantities are highly heated, as compared with the forward-flow temperature. Even shortly after the internal combustion engine has been started up, temperature differences of +80° C. arise. By contrast, the lubricating and cooling stream 13 through the high-pressure pump is not heated so highly by far, because it is not subjected to any appreciable pressure fluctuations.

The spill quantity from the common rail 15 is intermixed with the lubricating and cooling stream. This (already precooled) mixed quantity is delivered via a first return line 18 to a first cooler 19, which, as mentioned, is present only if required, and, after cooling, is utilized in a way known per se as a propulsion jet for the suction jet pump 4, to which it is delivered via a line 26, the latter being a continuation of the return line 18. This flow also undergoes a further restriction, since its pressure upstream of or in the suction jet pump should not be more than 600 hPa above the ambient pressure.

The spill quantity from the high-pressure regulating valve 17—the quantity of this greatly outweighs that of the spill stream from the common rail 15—is delivered to a further cooler 21 via a second return line 20. The two coolers 19 and 21 may form a structural unit, contrary to the illustration, but in this case the two streams are separated completely. They are, as a rule, designed as fuel/air heat exchangers. Their flow resistance is negligibly low.

Provided parallel to the further cooler 21 is a valve 22 which is switchable as a function of the temperature or which is thermally controlled. At low ambient temperatures, said valve leads a part stream of the spill quantity, highly heated from the outset, from the high-pressure regulating valve 17 past the cooler 21 and, via a throttle 23, directly into the suction screen 6 of the fuel pump 5. Upstream of the throttle 23, a branch line 24 having a spring-loaded nonreturn valve 25 branches off toward the outlet of the cooler 21, the nonreturn valve 25 allowing passage only in the direction of the cooler. This branch line ensures that the fuel filter 7, too, is heated at the very start of operation, before the cooler 21 takes effect. The nonreturn valve 25 prevents the forward flow of the fuel pump from being recirculated into the tank again via the branch line 24.

The detail in FIG. 2 shows a modified excerpt from an arrangement like that in FIG. 1. The change relates only to the connection from the thermally controlled valve 22 to the suction screen 6, but results in the advantage of an appreciable reduction in the length of a double return line due to the joint utilization of the line 26.

There is no special connection provided here between the suction screen 6 and the thermally controlled valve 22, but, with the configuration otherwise being the same, the outflow from said valve passes via the throttle into the line 26 between the first cooler 19 and the suction jet pump 4. The latter is represented here merely by its reference symbol next to an arrow pointing downward. In order to prevent an inadmissibly high propulsion pressure at the suction jet pump and branch off the part quantity required for heating the suction screen 6, a further pressure relief valve 27 is provided near the tank and parallel to the suction jet pump. In the event of a pressure increase above the already mentioned threshold of 600 hPa above ambient pressure which is permissible for the suction jet pump, this valve 27 allows the excess to flow out toward the suction screen.

It is apparent that, by virtue of this variant, a considerable reduction in the length of the double routing of the return lines 18 and 20 is possible, if, for example, as in the case of most motor vehicles, the engine is arranged at the front and the tank is arranged the rear axle. Specifically, if the coolers 19 and 21 arranged near the engine—the diagrammatic illustration in FIG. 1 is not representative of the actual spatial arrangement of the components—, then, according to FIG. 1, double routing of the return lines 18 and 20 over several meters is unavoidable. This is avoided by means of the variant according to FIG. 2.

What is claimed is:

1. A fuel supply system for diesel engines, comprising
   a fluidic series connection of a fuel pump (5) sucking out of a tank (1), a fuel filter (7) and a high-pressure pump (9),
   a parallel connection, located downstream of the high-pressure outlet (14) of the high-pressure pump (9), of a plurality of injectors (16) or injection nozzles and of an electrically controllable high-pressure regulating valve (17) with a return line (20), said parallel connection being capable of being fed by the high-pressure pump with a fuel stream under a pressure which is variable, as required, by the activation of the high-pressure regulating valve, at least one return line (18) for recirculating a fuel excess from the high-pressure regulating valve and/or the injectors into the tank (1), at least one cooler (19, 21) arranged in a return line, wherein a first return line (18) is located downstream of the injectors (16) and a second return line (20) downstream of the high-pressure regulating valve (17), and wherein at least the second return line (20) is connected to a cooler (21) which is connected on its outlet side to the connection between the fuel pump (5) and the high-pressure pump (9).

2. The fuel supply system as claimed in claim 1, wherein the cooler (21) opens on its outlet side into the forward-flow line between the fuel pump (5) and the fuel filter (7).

3. The fuel supply system as claimed in claim 1 or 2, wherein a thermally controlled valve (22) which, opens at low temperatures, is provided fluidically parallel to the cooler (21) of the second return line (20).

4. The fuel supply system as claimed in claim 3, wherein the outlet of the thermally controlled valve (22) is connected to the tank (1).

5. The fuel supply system as claimed in claim 4, wherein the outlet of the thermally controlled valve (22) is led to a suction screen (6), arranged in the tank (1), of the fuel pump (5), in order to heat said suction screen.

6. The fuel supply system as claimed in claim 3, wherein the outlets of the cooler (21) and of the thermally controlled valve (22) are connected via a branch line (24) to a nonreturn valve (25) through which the flow can pass from the valve (22).

7. The fuel supply system as claimed in claim 6, wherein a throttle (23) is provided, downstream of the branch point of the branch line (24), in the connection of the outlet of the valve (22) to the tank (1).

8. The fuel supply system as claimed in claim 5, wherein a cooler (19) is also built into the first return line (18) leading to the tank (1).

9. The fuel supply system as claimed in claim 8, wherein the streams of the first and second return lines (18, 20) are brought together downstream of a cooler (19), at least in part quantities, in a joint line (26).

10. The fuel supply system as claimed in claim 9, wherein the outlet of the thermally controlled valve (22) is connected via a throttle (23) to the joint line (26) running between the first cooler (19) and the tank (1).

11. The fuel supply system as claimed in claim 10, wherein, furthermore, a pressure relief valve (27) with a low switching threshold is connected to the line (26) leading to the suction jet pump (4), the outlet of said pressure relief valve being connected to the suction screen (6) of the fuel pump (5).

12. The fuel supply system as claimed in claim 8, wherein the coolers (19, 21) are combined into a structural unit with separate cooling streams.

* * * * *

UNITED STATES PATENT AND TRADEMARK OFFICE
CERTIFICATE OF CORRECTION

PATENT NO. : 6,234,151 B1  Page 1 of 1
DATED : May 22, 2001
INVENTOR(S) : Karl Eck It is certified that error appears in the above-identified patent and that said Letters Patent is hereby corrected as shown below:

<u>Title page,</u>
Replace "[22] Filed: Feb. 29, 2000"
with -- [22]  PCT Filed:      Sep. 9, 1998
       [86]  PCT No.:         PCT/EP98/05737
             § 371 Date:      Feb. 29, 2000
             § 102(e) Date:   Feb. 29, 2000
       [87]  PCT Pub. No.:    WO99/14486
             PCT Pub. Date:   March 25, 1999

[30]    Foreign Application Priority Data

Sep. 12, 1997 [DE] Germany ................. 197 40 057.4 --

Signed and Sealed this

Thirteenth Day of August, 2002

*Attest:*

JAMES E. ROGAN
*Attesting Officer*    *Director of the United States Patent and Trademark Office*